INVENTORS
MICHAEL J. CAPARONE
THEODORE J. DYKZEUL
BY
THEIR ATTORNEYS

INVENTORS
MICHAEL J. CAPARONE
THEODORE J. DYKZEUL

BY

*Caudr & Caudr*

THEIR ATTORNEYS

3,439,699
INTEGRAL VALVE AND DIAPHRAGM ASSEMBLY FOR A PRESSURE REGULATOR

Michael J. Caparone, Arcadia, and Theodore J. Dykzeul, Rolling Hills, Calif., assignors to Robertshaw Controls Company, Richmond, Va., a corporation of Delaware
Filed Mar. 23, 1964, Ser. No. 353,924
Int. Cl. F16k 43/00, 51/00; F16l 55/18
U.S. Cl. 137—315  14 Claims

ABSTRACT OF THE DISCLOSURE

This disclosure relates to a pressure regulator that includes a flexible diaphragm having a valve member that is integral therewith so as to provide a one-piece structure with the valve member itself being flexible so as to be initially flexed through a valve seat to subsequently open and close the same on the side thereof opposite to the flexible diaphragm in order to control the pressure of fluid passing through such valve seat and out through an outlet of a housing means containing such pressure regulator means.

---

This invention relates to an improved pressure regulator means or the like as well as to improved parts for and method of making such a pressure regulator means or the like.

Heretofore, various control devices have been provided for domestic water heater tanks and the like to control the heating thereof.

For example, one such prior known control device includes a housing means to receive fuel, such as gas or the like, from the source thereof, and having means to selectively direct the fuel into a pilot burner means and a main burner means, the pilot burner means having a continuously burning flame for igniting fuel issuing from the main burner means in an intermittent operation thereof and the main burner means being utilized to heat the water in the tank to tend to maintain the water at a constant temperature regardless of the amount of heated water drawn from the tank.

Such a prior known control device has a thermostatically operated valve means interconnecting the source of fuel with the main burner means whereby the thermostatic means senses the temperature of the water in the tank and opens the valve means when the temperature of the water falls below a selected temperature to cause the main burner means to heat the water tank up to the selected temperature whereby the thermostatic means closes valve means to terminate the operation of the main burner means.

However, it has been found that in such a prior known control device, not only must a separate adjustment be made on a pressure regulating means of the control device to effect proper flame characteristic of the pilot burner means, but also a separate adjustment must be made on the C valve or gas cock to select the proper burner input for a various capacity appliance.

According to the teachings of this invention, however, a separate pressure regulator is provided for the pilot burner means whereby initial adjustment of the pressure regulator will permit the fuel to issue from the pilot burner means at a substantially constant rate regardless of variations in the input pressure of the fuel as well as the intermittent operation of the main burner means.

Thus, when the pilot burner pressure regulator of this invention is utilized in combination with a separate pressure regulator for the main burner means, the need for either the pilot or main burner C valve adjustment, other than proper orificing of the pilot and main burner means for the various capacities at the set regulated gas pressures, are eliminated. The elimination of these commonly required adjustments is a convenience of commercial importance both to the appliance manufacturer and the user.

Thus, it can be seen that the pilot gas pressure regulator of this invention replaces the pilot adjusting key of prior known control devices.

Further, the pressure regulator means of this invention is so constructed and arranged that the same can be simply and effectively assembled to the desired control device in a unique manner hereinafter described whereby the overall cost of the same is relatively small when compared with other prior known pilot burner pressure regulators.

Accordingly, it is an object of this invention to provide an improved pressure regulator having one or more of the novel features set forth above or hereinafter shown or described.

Another object of this invention is to provide improved parts for such a pressure regulator or the like.

A further object of this invention is to provide an improved method for making such a pressure regulator or the like.

Other objects, uses and advantages of this invention are apparent from a reading of this description which proceeds with reference to the accompanying drawings forming a part thereof and wherein:

FIGURE 1 is a broken-away, fragmentary, perspective view illustrating the improved control device of this invention in combination with a water heater tank or the like.

FIGURE 2 is a fragmentary, cross-sectional view taken substantially on line 2—2 of FIGURE 1.

FIGURE 3 is an enlarged, partially broken-away, front view of the control device illustrated in FIGURE 1.

FIGURE 4 is a cross-sectional view of the control device illustrated in FIGURE 3 and is taken on line 4—4 thereof.

Figures 1, 2, 3, 4:
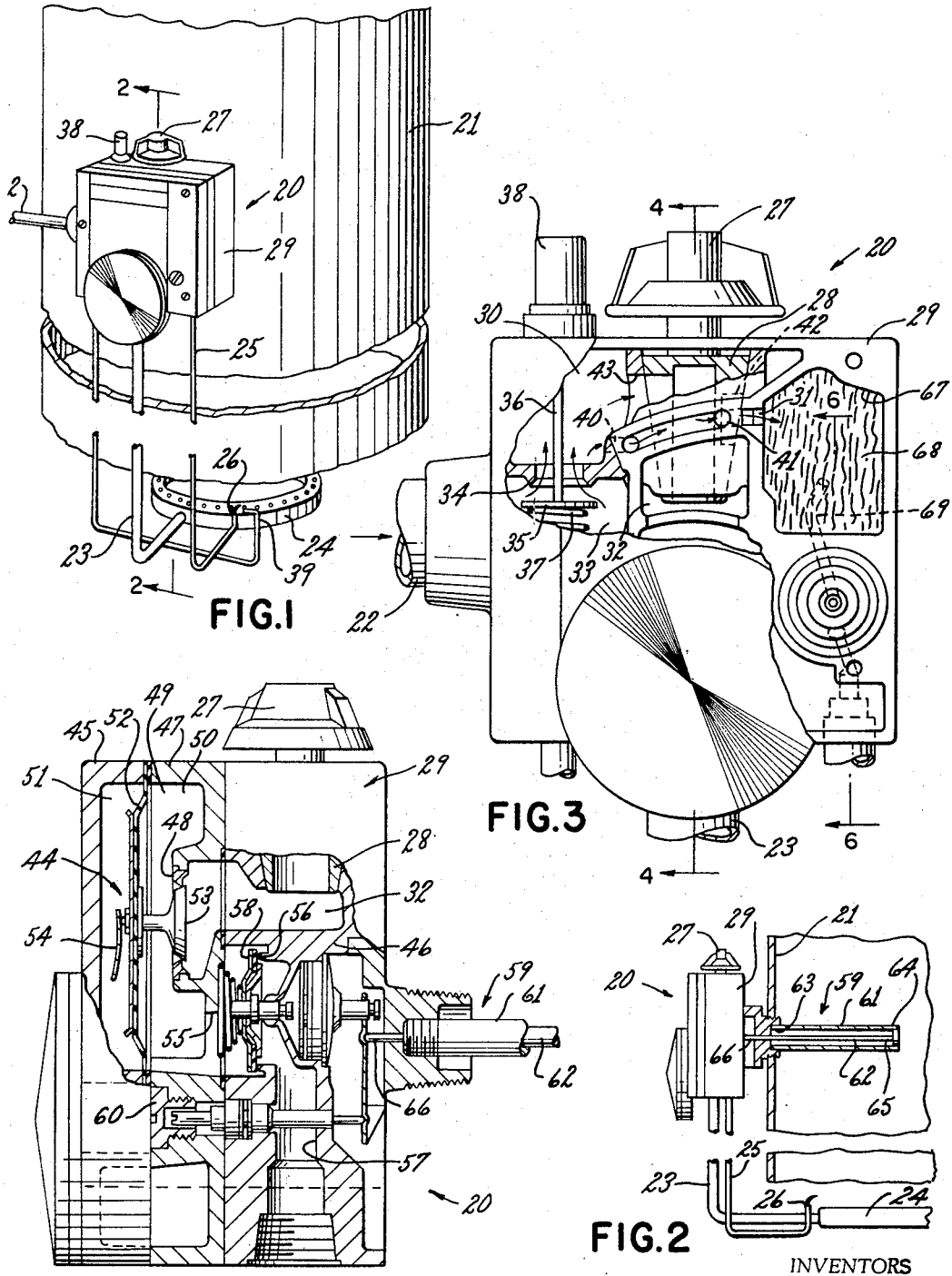

While the various features of this invention are hereinafter described and illustrated as being particularly adaptable for forming a pressure regulator for the pilot burner means of a control device for a domestic water heater tank or the like, it is to be understood that the various features of this invention can be utilized singly or in any combination thereof to provide other constructions as desired.

Therefore, this invention is not to be limited to only the embodiment illustrated in the drawings, because the drawings are merely utilized to illustrate one of the wide variety of uses of this invention.

Referring now to FIGURES 1 and 2, the improved control device of this invention is generally indicated by the reference numeral 20 and is adapted to maintain the temperature of the water contained in a water heater tank 21 at a selected temperature regardless of the amount of hot water drawn therefrom, the water level in the tank 21 being maintained at a substantially constant level by conventional means (not shown) as hot water is drawn from the tank 21.

In particular, the control device 20 is interconnected to a source of fuel by an inlet conduit 22 and is adapted to interconnect the inlet conduit 22 to an outlet conduit 23 leading to a main burner means 24 for heating the tank 21. The control device 20 is also adapted to interconnect the inlet conduit 22 to an outlet conduit 25 leading to a pilot burner means 26 utilized to ignite fuel issuing from the main burner means 24 in a manner hereinafter described.

A general operation of the control device 20 will now be described and reference is made to FIGURES 3 and 4.

When the water heater system of this invention is initially installed, a control knob 27 of the control device 20 is normally disposed in an "off" position thereof, whereby a cock valve 28 disposed in the housing 29 of the control device 20 is disposed in such a position that communication between a chamber 30 of the housing 29 and a pair of passages 31 and 32, respectively leading to the conduits 25 and 23 in a manner hereinafter described, is prevented.

The chamber 30 of the housing 29 is separated from an inlet chamber 33 by an annular valve seat 34, the inlet chamber 33 being in direct communication with the fuel inlet conduit 22.

A valve member 35, carried on a rod or shaft 36, is normally seated against the valve seat 34 by a spring 37 to prevent communication between the chambers 30 and 33, the rod 36 being adapted to be pushed downwardly to open the valve seat 34 by a button type plunger 38. The other end of the rod 36 is interconnected to suitable structure (not shown) which will hold the valve member 35 in the open position as illustrated in FIGURE 3 as long as a sensing member 39, FIGURE 1, senses a flame at the pilot burner means 26.

However, should the flame at the pilot burner means 26 be extinguished, the valve member 35 is returned to the closed position thereof in a conventional manner to prevent communication between the chambers 33 and 30 so that fuel cannot issue from the main burner means 24 as well as the pilot burner means 26 when no flame exists at the pilot burner means 26 to ignite the main burner means 24.

To actuate the water heater system of this invention, the control knob 26 is first rotated to a "pilot" position thereof whereby fuel is adapted to flow from the chamber 30 into a passage 40 leading to a passage 41 that is interconnected to the passage 31 by a groove 42 in the gas cock 28 in the manner illustrated in FIGURE 3, the gas cock 28 only being adapted to interconnect the chamber 30 with the pilot passage 31 and not with the main burner passage 32 when the control knob 27 is disposed in the "pilot" position thereof.

With the control knob 27 disposed in the "pilot" position thereof, the button 38 is manually pressed downwardly to manually open the valve member 35 whereby fuel can issue from the pilot burner means 26 and be ignited either manually or automatically as desired.

When a flame appears at the pilot burner means 26, the sensing means 39 senses the flame at the pilot burner means 26 and maintains the valve member 35 in the open position as illustrated in FIGURE 3.

After the pilot burner means 26 has been ignited and the valve member 35 is held in the open position thereof, the control knob 27 is rotated to the "ON" position thereof as illustrated in FIGURE 3 whereby a passage 43 of the gas cock 28 interconnects the chamber 30 with the passage 32 leading to the main burner means 24 in a manner hereinafter described.

In the particular embodiment of the control device 20 of this invention illustrated in the drawings, a pressure regulator 44, FIGURE 4, is provided for the main burner means 24 and will now be described. However, it is to be understood that the various features of this invention can be utilized without the pressure regulator 44 for the main burner means 24, as desired.

As illustrated in FIGURE 4, the housing 29 of the control device 20 is formed of two end housing sections 45 and 46 and a central housing section 47 suitably bolted together in a manner conventional in the art.

The passage 32 leading from the gas cock 28 is formed in the housing sections 46 and 47 and communicates with an annular valve seat 48 formed in the housing section 47, the valve seat 48 leading to a compartment 49 formed in the housing sections 45 and 47.

The compartment 49 of the housing 29 is divided into two chambers 50 and 51 by a flexible diaphragm 52 secured between the housing sections 45 and 47, the diaphragm 52 carrying a valve member 53 cooperating with the valve seat 38 to control the flow of fuel from the passage 32 into the chamber 50.

The valve member 53 is normally urged to the open position thereof by a lever 54 spring biased to the right by any of the means fully set forth in the co-pending patent application, Ser. No. 862,694, filed Dec. 29, 1959, and entitled "Control Devices," and now abandoned.

In this manner, the pressure of the fuel flowing through the chamber 50 of the housing 29 is regulated by the pressure regulator 44, the setting of the pressure regulator 44 being manual or automatic in any of the manners set forth in the aforementioned copending patent application.

The passage 55 leads from the chamber 50 to an annular valve seat 56 formed in the housing section 47, the annular valve seat 56 leading to an outlet passage 57 adapted to be interconnected to the outlet conduit 23 previously described and leading to the main burner means 24.

A valve means 58 is carried by the housing 29 and is adapted to cooperate with the valve seat 56 to control the flow of fuel to the main burner means 24.

The fuel is only adapted to pass through the valve means 58 in a manner hereinafter described when a water temperature sensing means for a thermostat 59, FIGURES 2 and 4, determines that the temperature of the water in the tank 21 has fallen below a temperature selected by a control means 60 disposed in an openable compartment of the control device 20.

The temperature sensing or thermostat means 59 comprises a conventional tube 61 and rod 62 arrangement, the tube 61 and rod 62 being disposed in the interior of the tank 21 in such a manner that the end 63 of the tube 61 is fixed relative to the tank 21 and the other end 64 thereof is free for movement relative to the tank 21.

The rod 62 has an end 65 secured to the free end 64 of the tube 61 and is formed of a material having a lower coefficient thermal expansion than the tube 61 whereby the free end 66 of the rod 62 is moved to the left as illustrated in FIGURE 4 when there is a decrease in temperature of the tank 21 because the tube 61 contracts. Conversely, the end 66 of the rod 62 is moved to the right as illustrated in FIGURE 4 when the temperature in the tank 21 increases because the tube 61 expands.

In this manner, the thermostatic means 59, after the pilot burner means 26 has been ignited and the control knob 27 is disposed in the "ON" position thereof, opens the valve means 58 in a manner fully described in the aforementioned co-pending patent application to allow fuel to issue to the main burner means 24 when the temperature of the water in the tank 21 has fallen below a selected temperature so that the main burner means 24 will heat the water in the tank 21 to the temperature selected by the control means 60 in a manner conventional in the art.

When the temperature of the water in the tank 21 has reached the desired temperature level, the thermostatic means 59 permits the valve means 58 to close so that no fuel issues from the main burner means 24 until the temperature of the water in the tank 21 falls below the selected temperature.

Thus, it can be seen that the main burner means 24 is intermittently operated by the thermostatic means 59 to maintain the water in the tank 21 at a selected temperature regardless of the amount of hot water drawn from the tank 21, the fuel issuing to the main burner means 24 being maintained at a substantially constant rate by the pressure regulator 44 in the manner fully described in the aforementioned co-pending patent application.

While one type of general control system for heating the water tank has been described, it is to be understood that such a system is merely emblematic of the many different types of systems to which the following features of this invention can be utilized.

The particular details of the control device 20 will now be described in connection with the separate pressure regulation of the flow of gas to the pilot burner means 26.

As illustrated in FIGURE 3, the pilot flow passage 21 is interconnected to a chamber 67 formed in the housing 29 and having a suitable filter means 68 disposed therein.

Figure 6:
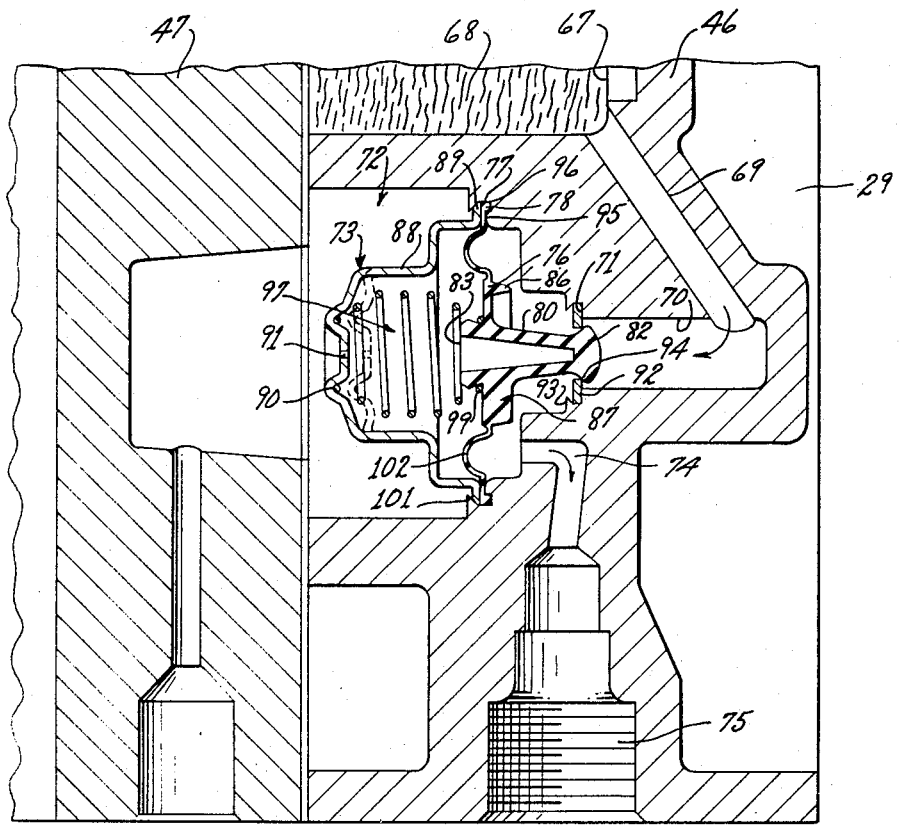
FIGURE 6 is an enlarged, fragmentary, cross-sectional view taken substantially on line 6—6 of FIGURE 3.

In this manner, fuel flows from the passage 31 into the chamber 67 and through the filter means 68 to a passage 69 leading to an inlet passage 70 formed in the housing 29 as illustrated in FIGURE 6.

The inlet passage 70 interrupts a surface 71 of the housing section 46 and is interconnected with a cavity 72 defined between the housing sections 46 and 47, the cavity 72 in the housing section 46 receiving a pressure regulator 73 of this invention.

The housing section 46 is provided with a passage means 74 interconnected with the chamber 72 to the left of the surface 71 for a purpose hereinafter described, the passage 74 terminating at an outlet port 75 which is adapted to be interconnected to the outlet conduit 25 leading to the pilot burner means 26.

Thus, it can be seen that the fuel flowing from the inlet conduit 22 to the pilot burner means 26 must first pass through the pressure regulator 73 of this invention whereby the pressure regulator 73 maintains the fuel flowing to the pilot burner means 26 at a substantially constant pressure regardless of the pressure regulation of the fuel flowing through the main burner means 24.

Further, it can be seen that the pressure regulation of the pilot burner means 26 is independent of the fluctuations of the input gas pressure as well as of the operation and pressure regulation of the main burner means 24.

Figure 5:
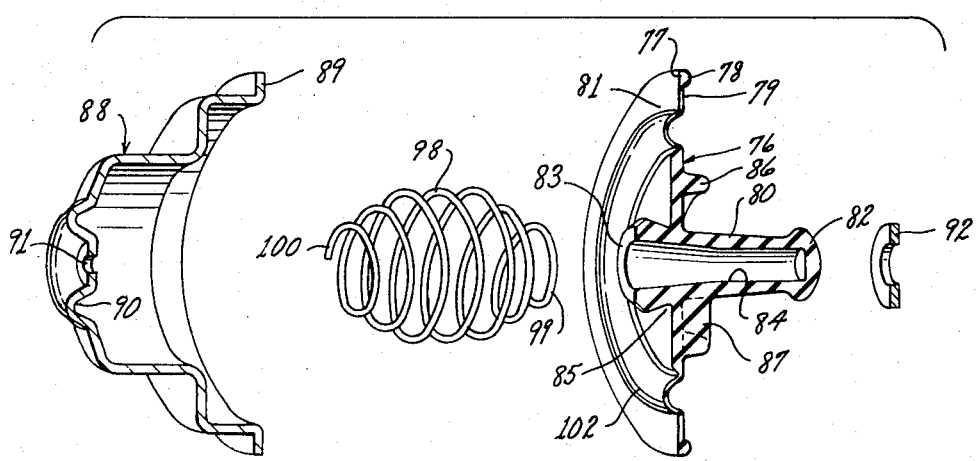
FIGURE 5 is an enlarged, exploded perspective view of the pressure regulator of this invention.

The pressure regulator 73 as illustrated in FIGURES 5 and 6 comprises a flexible diaphragm 76 having an outer peripheral edge 77 terminating in an outwardly directed annular bead 78 extending from the side 79 of the diaphragm 76.

The diaphragm has a post-like member 80 integral therewith and extending beyond the opposed sides 79 and 81 of the diaphragm 76, the post-like member 80 having a free end defining a valve member 82 in a manner hereinafter described. The other end 83 of the post-like member 80 is interrupted by a bore 84 and has an annular recess 85 formed therein adjacent the side 81 of the diaphragm 76 for a purpose hereinafter described.

An annular rib means 86 extends outwardly from the side 79 of the diaphragm 76 and is concentric with the post-like member 80. Radial ribs 87 integrally interconnect the post-like member 80 with the annular reinforcing rib 86 as illustrated in the drawings.

In order to obtain flexibility of the diaphragm 76, the diaphragm 76 is provided with an arcuate annular portion 102 as illustrated in the drawings.

A metallic cup-shaped member 88 is provided for the pressure regulator 73 and has an outwardly directed annular flange 89 at the open end thereof. In addition, the cup-shaped member 88 has an annular recess 90 provided in the closed end thereof and disposed concentrically around a vent opening 91 formed in the closed end thereof.

When it is desired to assemble the pressure regulator 73 of this invention in the control devire 20 previously described, the housing member 46 is utilized before the housing members 45 and 47 are assembled thereto.

A washer-like member 92 is inserted into the cavity 72 of the housing member 46 and is disposed against the annular shoulder 95 of the housing 46 and has the periph- illustrated in FIGURE 6 whereby the housing 46 can be staked over the washer-like member 92 at 93 to hold the washer-like member 92 in place so that the washer-like member 92 can provide a valve seat 94 interconnecting the inlet portion 69 of the housing 46 with the outlet portion 74 thereof for a purpose hereinafter described.

Thereafter, the flexible diaphragm 76 is disposed in the cavity 72 of the housing 46 in such a manner that the outer peripheral portion 77 thereof is disposed against an annular shoulder 95 of the housing 46 and has the peripheral bead 78 thereof received in an annular recess 96 formed in the shoulder 95 in the manner illustrated in FIGURE 6. Since the post-like member 80 and valve member 82 of the diaphragm 76 are flexible, the same are adapted to be flexed through the valve seat 94 into the position illustrated in FIGURE 6 whereby the valve member 82 is disposed on one side of the valve seat 94 and the remainder of the diaphragm 76 is disposed on the other side thereof.

Subsequently, the cup-shaped member 88 is disposed in the cavity 72 of the housing 46 and has the annular flange 98 has one end 99 thereof snapped over the left hand end the diaphragm 76 to hold the same against the shoulder 95 of the housing 46.

In this manner, the cup-shaped member 88 cooperates with the flexed side 81 of the flexible diaphragm 76 to define a chamber 97 therebetween.

Before the cup-shaped member 88 is disposed in the position illustrated in FIGURE 6, a compression spring 98 has one end 99 thereof snapped over the left hand end of the post-like member 80 of the diaphragm 76 so that the same is received in the annular recess 85 of the post-like member 80 in the position illustrated in FIGURE 6. Thus, when the cup-shaped member 88 is subsequently disposed in the position illustrated in FIGURE 6, the other end 100 of the barrel-shaped compression spring 98 is received in the annular recess 90 of the cup-shaped member 88 whereby the force of the compression spring 98 acting between the cup-shaped member 88 and the diaphragm 76 in stacked relation against the annular right to cause the valve member 82 to open the valve seat 94 for a purpose hereinafter described.

In order to hold the cup-shaped member 88 in the position illustrated in FIGURE 6, the housing 46 is staked over at 101 to hold the cup-shaped member 88 and flexible diaphragm 76 is stacked relation against the annular shoulder 95 of the housing 46.

Therefore, it can be seen that it is a relattively simple operation to assemble the pressure regulator means 73 of this invention in the housing 46 of the control device 20 for the purpose previously described.

Should it be desired to adjust the force of the compression spring 98 tending to open the valve member 82, the cup-shaped member 88 is made of sufficiently deformable material so that the closed end thereof can be inwardly deformed in the manner illustrated by dotted lines in FIGURE 6 to increase the force of the compression spring 98. Similarly, the closed end of the diaphragm of the cup-shaped member 88 can be deformed outwardly beyond the full line position thereof to decrease the force of the compression spring 98 in order to effectively adjust the pressure regulator 73 to the desired value thereof.

The chamber 97 of the pressure regulator 73 is vented to the atmosphere by the vent opening 91 in the cup-shaped member 88 and suitable passage means in the control device 20 as illustrated in FIGURE 6.

The operation of the pressure regulator 73 will now be described.

When fuel is adapted to flow through the passage means 69 by the cock valve 28 in the manner previously described, the fuel flows through the opened valve seat 94, the valve seat 94 being opened by the compression spring 98, and is adapted to flow against the side 79 of the diaphragm means 76 to be subsequently conveyed out through the outlet passage means 76 to the pilot burner means 26 for the purpose previously described.

However, should the pressure of the fluid acting against the side 79 of the diaphragm 76 exceed the force of the compression spring 98, it can be seen that the diaphragm 76 will be moved toward the left whereby the post-like member 80 will cause the valve member 82 to progressively move toward the valve seat 94 to close the same whereby the pressure valve of the fluid passing through the outlet passage means 74 to the pilot burner means 26 will be maintained at a constant pressure regardless of the input pressure of the fluid or the pressure regulation of the fluid flowing to the main burner means 24 for the reasons previously described.

Accordingly, it can be seen that not only does this invention provide an improved pressure regulator having many novel features, but also this invention provides improved parts for and methods of making such a pressure regulator or the like.

While the form of the invention now preferred has been disclosed as required by the statutes, other forms may be used, all coming within the scope of the claims which follow.

What is claimed is:

1. A pressure regulator or the like comprising a housing having an inlet and an outlet interconnected together by a valve seat, and a flexible diaphragm disposed against said housing on one side of said valve seat and carrying a valve member disposed on the other side of said valve seat for opening and closing said valve seat, said valve member and said diaphragm being integral so as to provide a one-piece structure.

2. A pressure regulator or the like as set forth in claim 1 wherein said valve member is adapted to be flexed through said valve seat from said one side thereof to said other side thereof.

3. A pressure regulator or the like as set forth in claim 1 wherein said valve member comprises a free end of a post-like member formed integrally with said diaphragm and projecting from one side thereof.

4. A pressure regulator or the like as set forth in claim 3 wherein said post-like member extends from the other side of said diaphragm and has a bore interrupting the same, said bore extending beyond said one side of said diaphragm.

5. A pressure regulator or the like comprising a housing having an inlet and an outlet interconnected together by a valve seat, a flexible diaphram disposed against said housing on one side of said valve seat and carrying a valve member disposed on the other side of said valve seat for opening and closing said valve seat, said valve member and said diaphragm being integral so as to provide a one-piece structure, a cup-shaped member carried by said housing and cooperating with said diaphragm to define a chamber therebetween disposed on the side of said diaphragm opposite to said valve member, and a spring means disposed in said chamber and respectively engaging said diaphragm and said cup-shaped member to tend to move said valve member away from said valve seat.

6. A pressure regulator or the like as set forth in claim 5 wherein said cup-shaped member has aperture means for venting said chamber to the atmosphere.

7. A pressure regulator as set forth in claim 5 wherein said valve member is flexible.

8. A pressure regulator or the like comprising a housing having an inlet and an outlet interconnected together by a valve seat, said housing having a shoulder spaced from said valve seat, a flexible diaphragm disposed on one side of said valve seat and having its outer periphery disposed against said shoulder of said housing, said diaphragm carrying a valve member disposed on the other side of said valve seat and being adapted to open and close said valve seat, said valve member and said diaphragm being integral so as to provide a one-piece structure, a cup-shaped member carried by said housing and holding said outer periphery of said diaphragm against said shoulder of said housing, said cup-shaped member cooperating with said diaphragm to define a chamber therebetween disposed on the side of said diaphragm opposite to said valve member, and a spring means disposed in said chamber and respectively engaging said diaphragm and said cup-shaped member to tend to move said valve member away from said valve seat.

9. A pressure regulator as set forth in claim 8 wherein said housing is staked over said cup-shaped member to hold said cup-shaped member and said diaphragm in stacked relation against said shoulder.

10. A pressure regulator as set forth in claim 8 wherein said housing has a second shoulder and wherein a washer-like member is disposed against said second shoulder to form said valve seat.

11. A pressure regulator as set forth in claim 10 wherein said housing is staked over said washer-like member to hold said washer-like member against said second shoulder.

12. A flexible one-piece structure comprising a flexible diaphragm having opposed sides, said diaphragm having a flexible valve member integral therewith and disposed spaced from one side thereof whereby said diaphragm can be disposed on one side of a valve seat and said valve member can be flexed through said valve seat to be disposed on the other side of said valve seat to open and close said valve seat and whereby said valve member and said diaphragm provide a one-piece structure.

13. A flexible one-piece structure as set forth in claim 12 wherein a flexible post-like member is integral with said diaphragm and projects outwardly from one side thereof, said post-like member having a free end forming said flexible valve member.

14. A flexible one-piece structure as set forth in claim 13 wherein said post-like member also projects outwardly from the other side of said diaphragm and is interrupted by a bore.

References Cited

UNITED STATES PATENTS

| | | | |
|---|---|---|---|
| 2,024,780 | 12/1935 | Ruckman | 137—505.39 XR |
| 2,737,201 | 3/1956 | St. Clair | 137—505.41 |
| 2,904,068 | 9/1959 | St. Clair | 137—505.41 |
| 2,936,595 | 5/1960 | Dillman | 137—505.41 XR |
| 2,979,067 | 4/1961 | Kern | 137—505.41 XR |
| 3,035,608 | 5/1962 | Ray | 137—505.41 |

HAROLD W. WEAKLEY, *Primary Examiner.*

U.S. Cl. X.R.

92—98; 137—505.41